(12) United States Patent
Brown (10) Patent No.: US 6,974,498 B2
(45) Date of Patent: Dec. 13, 2005

(54) HIGH-REFLECTANCE PAINT FOR HIGH-INTENSITY OPTICAL APPLICATIONS

(75) Inventor: Matthew Brown, Falls Church, VA (US)

(73) Assignee: Advanced Optical Technologies, LLC, McLean, VA (US)

(*) Notice: Subject to any disclaimer, the term of this patent is extended or adjusted under 35 U.S.C. 154(b) by 13 days.

(21) Appl. No.: 10/686,575

(22) Filed: Oct. 17, 2003

(65) Prior Publication Data

US 2004/0069940 A1 Apr. 15, 2004

Related U.S. Application Data

(62) Division of application No. 09/866,516, filed on May 29, 2001, now Pat. No. 6,700,112.

(51) Int. Cl.[7] ............................................. C09D 1/02
(52) U.S. Cl. ..................... 106/38.6; 106/600; 106/635; 250/237 R
(58) Field of Search ................ 106/38.3, 600, 106/635; 250/228, 237 R (56) References Cited

U.S. PATENT DOCUMENTS

| | | | | |
|---|---|---|---|---|
| 3,769,050 A | * | 10/1973 | Terry et al. ............... | 106/635 |
| 4,111,851 A | | 9/1978 | Shai | |
| 4,286,042 A | | 8/1981 | Sakai et al. | |
| 5,296,285 A | * | 3/1994 | Babel et al. ............... | 428/213 |
| 5,885,658 A | | 3/1999 | Babel et al. | |
| 5,914,487 A | | 6/1999 | Ramer et al. | |
| 5,967,652 A | | 10/1999 | Ramer et al. | |
| 6,064,061 A | | 5/2000 | Ramer et al. | |

OTHER PUBLICATIONS

I I T Research Institute, Jan. 2000, Z93–P Thermal Control Coating Kit, MSDS, pp 29.*
"Paint, Z–93 or Z–93P Temperature Control, Specification For," Advanced Materials & Coatings Laboratory IIT Research Institute (AMCL/IITRI), Chicago, IL 60616, Nov. 1962, Specification No. IITRI–MD–C08089–SP9, pp. 1–9.
"Paint, Z–93 or Z–93P Temperature Control, Application Of, Specification For," Advanced Materials & Coatings Laboratory IIT Research Institute (AMCL/IITRI), Chicago, IL 60616, Specification No. IITRI–MD–C08089–SP10, Apr. 1992, pp. 1–13.
"Z93–P Thermal Control Coating Kit," IIT Research Insitiute (IITRI), Chicago, IL 60616, Jan. 2000, MSDS No. Z93–P Kit.doc.

* cited by examiner

*Primary Examiner*—C. Melissa Koslow
*Assistant Examiner*—S. S. Manlove
(74) *Attorney, Agent, or Firm*—McDermott Will & Emery LLP (57) ABSTRACT

Many commercial radiant energy processing systems, such as luminaires and light detectors, require highly efficient diffusely reflective surfaces that can withstand high temperatures. As disclosed herein, a reflector for such a device is constructed of a substrate with a reflective coating, for example painted onto one or more surfaces of the substrate. The coating material comprises a zinc oxide pigment, preferably an uncalcined zinc oxide together with a small amount of a dispersing agent. The pigment and water are mixed together with an alkali metal silicate vehicle-binder (preferably a potassium silicate), for example, in a sheer mixer. The resulting material can be painted onto the desired surface, for example by spraying, spot-brushing or dipping.

4 Claims, 6 Drawing Sheets

HIGH-REFLECTANCE PAINT FOR HIGH-INTENSITY OPTICAL APPLICATIONS

This is a division of Ser. No. 09/866,516 filed May 29, 2001 now U.S. Pat. No. 6,700,112.

FIELD OF THE INVENTION

The present inventions relate to a highly reflective coating, with a diffuse reflectivity and good resistance to high temperatures, techniques for preparing and applying the coating (e.g. as a paint), light reflectors coated with the material on one or more surfaces, as well as lighting systems or other energy transducer systems incorporating reflectors manufactured with such surface coatings.

BACKGROUND

Radiant energy transducer systems find a wide range of applications in modern technology. Electrically driven transducers, for example, emit radiation to illuminate a desired area or footprint. The transducer system may illuminate the area for a number of reasons. For example, if the emitting transducer emits visible light, the illumination may facilitate use of the area by human personnel. If the illumination of the area provides infrared radiant energy, the illumination may facilitate some associated detection operation or human monitoring of the area through special night vision equipment.

Many such systems require a diffuse reflectivity on one or more surfaces within each system, and for efficiency, the reflectivity of such surfaces must be relatively high. In at least some applications, the reflective surfaces are subject to high-intensity light and attendant high temperatures.

One example of a material with a high diffuse reflectivity is SPECTRALON, and use of this material has been suggested for optical transducer systems, including light systems. Attention is directed for example to commonly assigned U.S. Pat. No. 6,064,061 to Ramer et al. This material, however, generally has to be molded and machined, and is not easily applied as a coating. Such molding and/or machining is often too expensive for mass production applications, for example, for lighting fixtures.

It has been known to use a variety of white paints for forming necessary reflector surfaces. U.S. Pat. No. 5,967,652 to Ramer et al suggested that diffusely reflective surfaces for a luminaire could be constructed of a suitable base material of, for example, aluminum or plastic, with a coating of a diffuse reflective material such as barium sulfate or quasi-diffuse reflective materials, such as white paint.

However, readily available coating materials, particularly those available in the quantities and at the prices appropriate for mass production use, have suffered from inadequate reflectivity and/or excessive sensitivity to temperature. In a luminaire, for example, if the diffuse reflectivity of a reflective surface is not high enough, then the lamp within the luminaire must emit more light to achieve a desired illumination performance characteristic. If the material providing the diffuse reflectivity is too sensitive to temperature, it can not withstand the heat from certain types of high intensity lamps. If overheated, the material may break down and become even less reflective (e.g., turn brown), or the material may even catch fire. To avoid these consequences, using existing reflective materials, luminaires often may need to be designed to provide relatively large spacings of the reflectors from the lamps, to allow for heat dissipation. This approach, however, increases the overall size, weight and complexity of the luminaire.

Exotic materials are known, which may be spray-painted under carefully controlled conditions and exhibit both a hi-reflectivity and high resistance to temperature. However, such materials have been extremely expensive, as well as difficult and expensive to apply. As a result, such materials have not been utilized in optical transducer systems, like mass produced luminaires.

For example, U.S. Pat. No. 4,111,851 to Shai discloses a coating characterized by low thermal absorption and high thermal emittance. This patented coating comprises: (a) a fired oxide pigment of aluminum oxide and zinc oxide, a vehicle-binder comprising an alkali metal silicate; and sufficient water to provide a mixture suitable for application to a substrate, such as aluminum. The patent, however, teaches use of this material for coating the surfaces of spacecraft. U.S. Pat. Nos. 5,296,285 and 5,885,658 to Bable et al. teach complicated techniques for coating metal substrates with similar white paints having low solar absorbance and high heat emittance. All three patents teach use of these materials and complex application techniques for thermal control applications on the exteriors of spacecraft.

Another example of an available inorganic white paint for such spacecraft applications is the paint marketed as Z-93 by Illinois Institute of Technology Research Institute (IITRI), which apparently comprises calcined zinc oxide particles and a potassium silicate binder. The calcination process involves firing or baking the zinc oxide, in excess of 1000° C. for greater than 8 hours, to remove impurities. Because of the time and energy required to produce calcined zinc oxide this step increases the overall cost of the material significantly, and in turn the cost of the coating. The Z-93 material currently sells for $125 per pint. Also, this material requires a very complex and expensive process to mix and apply. For example, IITRI specifies a mixing period of 6 to 8 hours in a ball end mill (a drum filled with the coating and porcelain balls). Although the material is sprayable or spot brushable, IITRI specifies very precise temperature and humidity requirements during application and curing of their paint. For example, the coating must cure at >50% for the first 5–6 hours and at ambient conditions for seven days. These requirements for preparing, applying and curing the Z-93 material radically increase the complexity and cost of manufacturing components with such a coating. While these costs may be acceptable in one-off applications, such as spacecraft, they make the use of the Z-93 coating in mass-production applications completely impractical, economically.

Hence, there is a continuing need for highly efficient radiant energy transducer systems. To support that general need, there is an attendant need for radiant energy transducer systems and for reflectors for such systems which have desirable diffuse reflective properties yet are easy and cost effective to mass produce. Hence, a need exists in the context of radiant energy transducer systems, for an easily applicable coating material, of relatively low cost, which exhibits diffuse reflectivity, is highly reflective and is relatively stable when exposed to high levels of light and heat. There is an attendant need for techniques to mix and apply such reflective materials to substrates of reflectors, in a manner that is efficient and cost effective in a mass production environment.

SUMMARY OF THE INVENTION

The inventive concepts address the stated needs and alleviate the above noted problems with the prior art by providing a paintable highly reflective diffuse coating material, processes for the mixing and application thereof, reflector products coated with the material and radiant energy transducer systems (e.g. luminaires) that incorporate such reflectors.

Several aspects of the present invention also envision application of the inventive reflective materials to surfaces of optical distribution devices and/or optical sensors that require optical surfaces that have a diffuse reflectivity and are highly reflective. The material is particularly advantageous in systems where the dimensions and illumination power create a high temperature, and therefore, the material of the reflective surface must withstand such a high temperature.

For example, one aspect of the present invention relates to a radiant energy transducer system, comprising a radiant energy reflector, having a diffusely reflective area. The system includes a transducer, associated with the reflector, for transducing between radiant energy reflected from at least a portion of the diffusely reflective area and an electrical signal corresponding to the reflected radiant energy. In an emitter type system, such as a visible light luminaire, the transducer comprises one or more lamps. In the context of a sensor or detector system, the transducer comprises one or more energy detectors, such as photodiodes or other photodetectors.

In the inventive system, the reflector comprises a substantially rigid substrate, for example constructed of steel or plastic, or of an aluminum or aluminum alloy, shaped to provide the desired configuration for a particular energy processing application. A surface of the substrate is configured to provide a predetermined shape for the diffusely reflective area. In a luminaire for example, the substrate may form a cavity in the shape of a portion of a sphere or cylinder, or the substrate may form a parabola. The inventive system also includes a diffusely reflective coating on the surface of the substrate, to provide the desired reflective characteristics for the reflector. The coating material includes a zinc-oxide based pigment, consisting essentially of an uncalcined zinc oxide and preferably containing a small amount of a dispersing agent. The pigment is mixed with an alkali metal silicate vehicle-binder, which preferably is a potassium silicate, to form the coating material. When the pigment and binder are mixed with an appropriate amount of water, the liquid form of the material forms a paint for easy application to surfaces to provide the desired reflective and heat resistant properties.

Other inventive aspects relate to a material or paint for application to a substrate of a reflector for a radiant energy transducer system. The coating material exhibits a diffuse reflective characteristic, a high reflectivity to radiant energy and a high stability when exposed to relatively high temperatures.

The ratio of weight of pigment to weight of binder preferably is between approximately 1.41:1 and 1.15:1. Within this ratio range, a most preferred or typical value for this weight ratio is around 1.28:1. These weight ratios apply both in the liquid (paint) state of the material and in the dry coating state on the surface of the reflector.

The preferred embodiment utilizes a pigment that includes a small amount of a dispersing agent, such as propionic acid. For example, the pigment which is predominantly uncalcined zinc oxide may also include approximately ½% by weight of the propionic acid.

Sufficient water is included, to provide a mixture suitable for application to the substrate of the reflector. The material preferably forms a water soluble, sprayable paint. The amount of water may be increased to facilitate other forms of application, for example, to allow dipping of articles such as light bulbs in the liquid material to coat the desired surface thereof.

The preferred range of acceptable amounts (%) of water, for dilution of the mixture in the liquid state is between a minimum of 7% and a maximum slightly higher than 40% (40.14% in a specific example). A more preferred range is from 22.63% to 25%, with the typical percentage value for the water around 24%.

In the various embodiments, the reflector, with the coated substrate provides diffuse reflectivity $\geq 95\%$. To provide the desired reflectivity, the coating should be 2.75 mils or greater in thickness. However, if it is desired to provide a semi-reflective semi-transmissive coating, for example on a transparent substrate (e.g. the glass globe of a light bulb), then the coating can be applied to a thickness of <1 mil. In such a case, some light passes through the substrate and the coating, and some light is reflected. Using the preferred zinc oxide-potassium silicate coating compositions, the materials can substantially withstand temperatures up to at least 250° C. The preferred formulation of the material has been tested and found to withstand temperatures as high as 700° C.

The use of the uncalcined zinc oxide, instead of the calcined zinc oxide, as in the prior art materials (e.g. the IITRI coating) substantially reduces the cost of the material, yet allows the material to provide the performance desired for lighting and other radiant energy system applications.

Other aspects of the invention encompass techniques for mixing and applying the material to form reflectors, so as to facilitate practical, economical mass-production. Such an aspect, for example, might relate to a method of manufacturing a reflector for use in a radiant energy transducer system. The preferred method involves forming a substantially rigid substrate, having a surface configured to provide a predetermined reflector shape. An uncalcined zinc-oxide pigment is mixed with an alkali metal silicate vehicle-binder and water in a shear mixer. The resulting mixture may be painted onto the surface of the substrate to form a diffusely reflective coating, for example by spraying, dipping or brushing.

Because the paint is water-based, it is water soluble and therefore easy to handle and clean-up, in an industrial paint type application. Also, the material is relatively non-toxic. The paint and its processing are relatively in-expensive. Yet the product provides a high degree of reflectivity and a high tolerance to heat.

It is contemplated that the coating may be used in virtually any type of radiant energy transducer system requiring a diffuse reflectivity. The preferred embodiments described in detail below show just a few specific types of such systems, by way of example.

Additional objects, advantages and novel features of the invention will be set forth in part in the description which follows, and in part will become apparent to those skilled in the art upon examination of the following and the accompanying drawings or may be learned by practice of the invention. The objects and advantages of the invention may be realized and attained by means of the instrumentalities and combinations particularly pointed out in the appended claims.

BRIEF DESCRIPTION OF THE DRAWINGS

The drawing figures depict preferred embodiments of the present invention by way of example, not by way of limitations. In the figures, like reference numerals refer to the same or similar elements.

FIG. 8 is a computer line drawing of a further embodiment of a lighting system utilizing the principles of the invention, for example, for illumination under a canopy in a service station or the like.

DETAILED DESCRIPTION OF THE PREFERRED EMBODIMENTS

Various aspects of the invention disclosed herein relate to radiant energy transducer systems, particularly luminaires and light detector systems, incorporating a reflector that uses a diffusely reflective coating formed of a white oxide pigment and an inorganic binder. The preferred coatings comprise uncalcined zinc oxide pigment and a potassium silicate binder, and may include a relatively small amount of propionic acid as a dispersing agent. Other aspects of the invention relate to reflectors for use in such systems, which comprise a substrate and the inventive coating. Other aspects of the invention relate to techniques for preparing and applying the coating to the substrate of a reflector, in a manner amenable to mass-production.

Figure 1A:
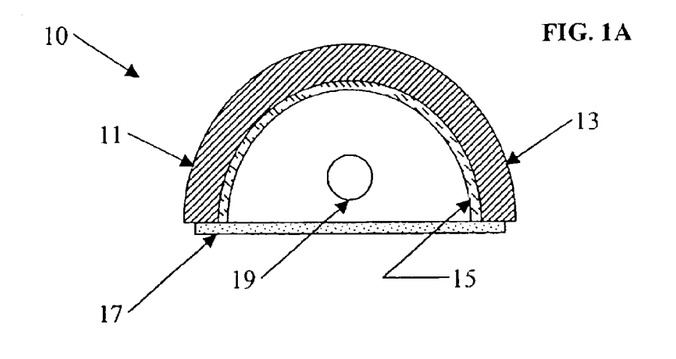
FIG. 1A is a cross-sectional view of a radiant energy transducer system, incorporating the diffusely reflective coating, in accord with an embodiment of the invention.

Reference now is made in detail to the presently preferred embodiments of the invention, examples of which are illustrated in the accompanying drawings and discussed below. FIG. 1A is a simplified illustration of one type of radiant energy transducer system 10, incorporating a diffusely reflective coating on a reflector, in accord with the invention.

The system 10 includes a reflector 11, comprising a substrate 13 and a reflective coating 15. The substrate 13 of the reflector 11 may have any desired or convenient shape, to provide desired reflection to or from an opening facing toward an intended field of view or intended field of illumination. The substrate 13 may be formed of a variety of relatively rigid materials, such as aluminum, aluminum alloy, steel or plastic.

In the implementation shown, the system 10 includes a cover 17 over the opening. The cover passes light, although it may be transparent or translucent. The cover is optional.

The system also includes a transducer 19, associated with the reflector, for transducing between radiant energy reflected from at least a portion of the diffusely reflective area of the coating 15 and an electrical signal corresponding to the reflected radiant energy. The invention is applicable to both energy detecting systems and energy emitting or distributing systems, and the invention is applicable to systems operating in a wide range of the radiant energy spectrum from infrared through the visible spectrum to ultra-violet.

In the context of a sensor or detector system, the transducer 19 comprises one or more energy detectors, such as photodiodes or other photodetectors. The detectors may be located within the enclosure formed by the reflective surface 15 and the cover 17. Alternatively, the detecting type transducer(s) may be remotely located, and the light supplied from that area to the transducer(s) via some guide, such as an optical fiber coupled to an opening through the substrate 13 and the coating 15.

Many of the presently preferred applications of the inventive principles relate to systems that provide visible light illumination, that is to say systems often referred to as "luminaires." In an emitter type system, such as a visible light luminaire, the transducer 19 comprises one or more lamps emitting light in the desired region of the spectrum and at an intensity appropriate for the desired application. The lamp or lamps 19 may be positioned within the enclosure formed by the reflective surface 15 and the cover 17, or the lamp(s) may be remotely located and the light supplied to that area via some guide, such as an optical fiber coupled to an opening through the substrate 13 and the coating 15.

In the inventive system 10, the reflector 11 comprises a substantially rigid substrate 13, for example constructed of aluminum or an aluminum alloy shaped to provide the desired configuration for a particular energy processing application. A surface of the substrate is configured to provide a predetermined shape for the diffusely reflective area. In a luminaire for example, the substrate 13 may form a cavity in the shape of a portion of a sphere or cylinder. Alternatively, the substrate 13 may form a parabola or a cone or even an integrating sphere. Those skilled in the art will be familiar with a wide variety of other reflector shapes that are desirable for different types of lighting applications.

The inventive system 10 also includes a diffusely reflective coating 15 applied and bonded to the surface of the substrate 13, to provide the desired reflective characteristics for the reflector. The coating material 15 comprises a zinc-oxide based pigment mixed with an alkali metal silicate vehicle-binder, which preferably is a potassium silicate. Preferably the pigment consists mainly of uncalcined zinc oxide, although the pigment may include small amounts of one or more additional materials, such as a dispersing agent.

Figure 1B:
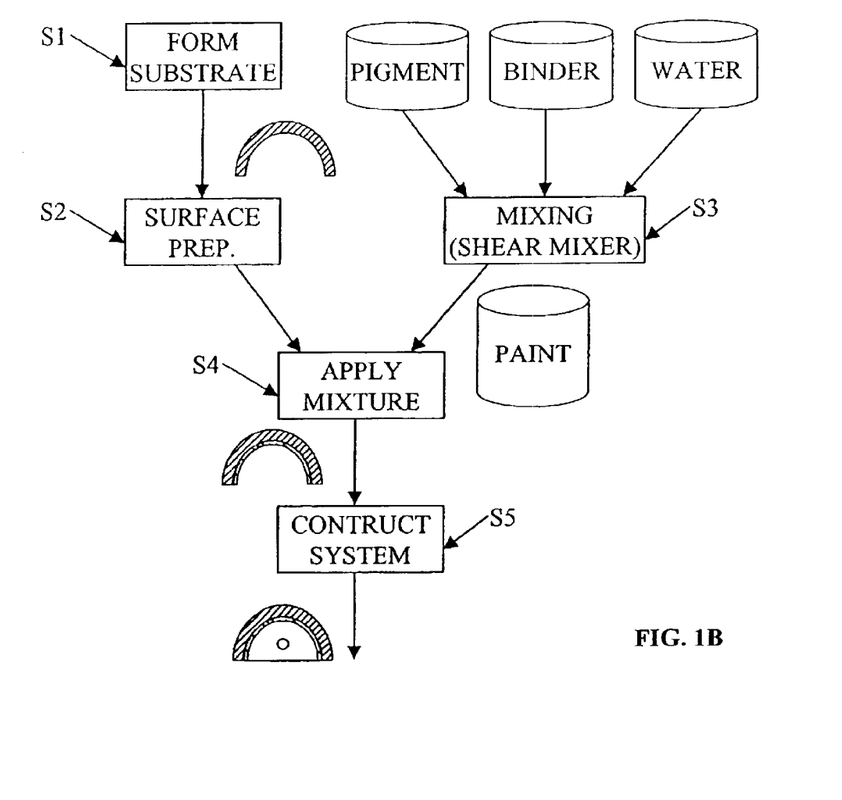
FIG. 1B is a flow-chart illustrating the process for manufacturing a reflector and a transducer system, such as shown in FIG. 1A, in accord with process aspects of the invention.

FIG. 1B is a flow chart showing the process of manufacturing a reflector and a transducer system incorporating the reflector, such as the system 10 shown in FIG. 1A, in accord with aspects of the invention. The method involves forming a substantially rigid substrate (S1) having a surface configured to provide a predetermined reflector shape. Preferably, the surface is prepared by an appropriate cleaning procedure (S2). Surfaces to be painted should be cleaned and degreased. If the substrate is an aluminum or aluminum alloy, for example, this step may entail etching the surface or abrasive cleaning of the surface, followed by a pre-treatment surface sealer. All surfaces should be thoroughly dried before painting.

The pigment, comprising the uncalcined zinc-oxide, is mixed with an alkali metal silicate vehicle-binder and water in a shear mixer (S3), to form a paint mixture.

The presently preferred embodiment utilizes Kadox 930C as the white pigment. The C indicates that there is approximately ½% propionic acid by weight, included with the uncalcined zinc oxide, to serve as a dispersing agent. In exemplary embodiments, this pigment is mixed with of a potassium silicate binder, such as Kasil 2130. The mixture initially includes a sufficient amount of deionized and/or distilled water to enable application of the material as a paint, for example by spraying onto the surface of the substrate 13. In embodiments that have been tested and found adequate for spray painting, the aggregate was mixed, for as little as three to five minutes in a shear mixer, such as a blender, at a spindle speed of 1000–2000 rpm. Additional amounts of water may be used if a thinner mixture is desired, for example, to allow dipping of optical substrate components, such as glass light bulbs, into the paint.

In one exemplary embodiment, 1000 grams of uncalcined zinc oxide was mixed with 780 grams of potassium silicate binder. For purposes of spray-type application, the mixture included 400 grams of water. The mixture was mixed in a shear mixer for three to five minutes at a spindle speed of 1000–2000 rpm.

Preferably, the material is supplied as separate components. One component is a powder component containing the zinc oxide. The potassium silicate comes mixed and dissolved in a de-ionized water solution. The powder and the silicate solution are combined and mixed with additional de-ionized water to obtain the necessary viscosity (preferably 15–25 seconds #2 Zahn cup). With this technique, the resulting paint has a recommended eight-hour shelf life. However, this product may be delivered with the pigment and the binder in a pre-mixed single component form, requiring at most addition of de-ionized water to obtain the necessary viscosity. In the latter case, shelf-life should not be an issue. The single component product has produced adequate reflectivity and temperature resistance, however, the two component delivery method produces better surface quality when mixed and painted.

The mixture is strained, using a medium mesh filter (300–400 micro). While awaiting use, the mixture should be kept agitated, to prevent settling.

To generate an actual product, the method of FIG. 1B entails painting the paint mixture onto the prepared surface of the substrate, to form a diffusely reflective coating thereon (S4). The reflector prepared in this manner then is used to construct an actual transducer system (S5). The precise order of the final steps are not critical. For example, in an embodiment wherein the transducer system takes the form of a light bulb (FIG. 4), the coating may be painted onto the inside of the transparent globe (substrate) before assembly of the light bulb. Alternatively, the light bulb may be fully assembled and later sprayed with or dipped into the coating mixture, to form the reflective coating on the outside of the globe (substrate).

To provide the desired reflectivity, as in the other embodiments, the coating should be 2.75 mils or greater in thickness. Preferred dry film thickness ranges from 2.75 mils to 3.5 mils (wet film thickness 5.25 mils to 6.0 mils). However, if it is desired to provide a semi-reflective semi-transmissive coating on the transparent globe, then the coating can be applied to a thickness of <1 mil. In such a case, some light passes through the glass and the coating, and some light is reflected.

In step S4, the material may be applied essentially in the same manners as other water-based paints, for example by spraying or spot-brushing. Spray painting, for example, may utilize any standard agitated reservoir wet spray equipment, particularly of types commonly used for applying water-based paints in mass production operations. The paint may be applied under ambient conditions, such as 50° to 90° F. (10° to 32° C.) and relative humidity of 50% or higher. The coating should be applied as a continuous wet film. It is recommended that the part not be allowed to completely dry between passes or coats, to avoid degradation of adhesion. The desired coating thickness is built-up by spraying several thin coats, while keeping the gun 8–12 inches from the substrate. The parts are allowed to dry only for a period of seconds or minutes between coats, so that the gloss of wetness begins to disappear but the coating does not dry completely. The process of spraying thin coats repeats until the total coating thickness achieves a desired wet film thickness.

It also is recommended that the paint gun have a Teflon® coated exterior and air cap, Delrin nozzle, leather needle packing and a heavy duty air spring, because zinc coatings tend to have tenacious adhesion to anodized aluminum and stainless steel. Exemplary application equipment is listed in Table 1.

TABLE 1

| APPLICATION EQUIPMENT FOR AIR SPRAY | | | | | | |
|---|---|---|---|---|---|---|
| Gun | Fluid Tip | Air Cap | Air Hose ID | Mat'l Hose ID | Atomizing Pressure | Pot Pressure |
| Binks(1) | 1.8 mm | 16–22 cfm | 3/8"ID (9.5 mm) | 3/8"ID (9.5 mm) | 45–65 psi (3.1–4.5 bar) | 10–20 psi(2) (0.7–1.4 bar) |

Pressure is designated for no more than 25 feet of hose. The pressure pot should be at or above the elevation to the spray gun. It is preferred to always keep the zinc coating under agitation. Should work be stopped for 10–15 minutes, material should not remain in the hose. The pot pressure should be shut off at the fluid regulator and the pressure relief valve opened. In this situation, the operator should loosen the conventional spray gun cap ring three turns, hold a cloth over air cap holes, and pull the trigger to force the material in the hose back into the pot. During shut-down, it is desirable to keep material under agitation but do not re-pressurize pot until ready to resume work. Also, the material should not be forced back to a container with an airless gun.

The operator can adjust tip and atomizing pressure for individual technique and weather conditions. Use in conjunction with a pail (5 gal.) mount agitator is recommended. The operator should spray only well agitated material.

It is preferred that the paint cure for a period of at least twenty-four hours. Curing may be accomplished at ambient conditions, 50° to 90° F., and relative humidity of 40% or higher, however, it is believed that these ranges for curing conditions can be successfully extended. The product should air dry for 1–3 hours before handling and 1–7 days for complete curing. Forced or accelerated drying/curing is not presently recommended.

If applied in such a manner to form a coating 15 of 2.75 mils or more dry-film thickness on the surface of the substrate 13, the resulting reflective surface exhibits a diffuse reflectivity of 95% or more (e.g. 95–97%) across the visible spectrum 450 to 800 nanometers. Typically, a coating formed by applying the paint to a thickness of approximately 2.75 mils will exhibit a reflectance of 96%.

The coating is UV stable and is able to withstand temperatures in ranges that may be at or above 250° C. The preferred formulation of the material has been tested and found to withstand temperatures as high as 700° C. However, reflectivity does change between 300° C. and 700° C. This change appears as a yellowing that disappears upon cooling of the material back below 300° C. Of course, if the coating can withstand such high temperatures, it is unaffected by lower internal system temperatures. In particular, at the higher temperatures, the coating 15 does not brown or otherwise discolor even after prolonged exposure and usage within the luminaire or other radiant energy transducer system 10.

Table 2 lists a number of examples of the formulation in accord with the present invention.

The fourth pair of columns shows the relevant weight and percentage values, where the pigment and binder are the 'typical' amounts, but the water is maximized. As such, this example shows the most diluted form of the paint that is believed to provide acceptable results. By contrast, the final pair of columns shows the relevant weight and percentage values, where the pigment and binder are the 'typical' amounts but the water is minimized. As such, this example shows the thickest form of the paint that is believed to provide acceptable results.

From Table 2, it is possible to extrapolate certain ranges for the material components. The ratio of weight of pigment to weight of binder should be between approximately 1.41:1 (corresponding roughly to 829.51:588) and 1.15:1 (corresponding roughly to 678.69:588). Within this range, a most preferred or typical value for this weight ration is around 1.28:1 (754.1:588). These weight ratios apply both in the liquid (paint) state of the material and in the dry coating state, after application to the surface of the reflector.

Table 2 also shows a range of acceptable amounts (%) of water, for dilution of the mixture in the liquid state. The percentage of water (by weight) ranges from a minimum of 7% to a maximum slightly higher than 40% (40.14% in the Max H2O example). A more preferred range is from 22.63% to 25%, with the typical percentage value for the water around 24%.

Exemplary quantities for paint kits currently intended for commercial distribution, are as follows:

TABLE 2

| Component | Typical | | Max ZO | | Min ZO | | Max H2O | | Min H2O | |
| --- | --- | --- | --- | --- | --- | --- | --- | --- | --- | --- |
| | gr | % | gr | % | gr | % | gr | % | gr | % |
| zo | 754.1 | 43% | 829.51 | 45.27 | 678.69 | 40% | 754.1 | 33.63 | 754.1 | 52% |
| $H_2O$ | 414.65 | 24% | 414.65 | 22.63 | 414.65 | 25% | 900 | 40.14 | 100 | 7% |
| ps | 588 | 33% | 588 | 32.09 | 588 | 35% | 588 | 26.23 | 588 | 41% |
| | 1756.75 | 100% | 1832.16 | 100.00 | 1681.34 | 100% | 2242.1 | 100.00 | 1442.1 | 100% |

The "zo" in Table 2 refers t the pigment comprising zinc-oxide and approximately ½% of dispersing agent, such as propionic acid. The "ps" in the table refers to the binder, in the preferred embodiment, potassium silicate. The amounts and percentages shown are those in the liquid state after mixing, that is to say before paint application to the reflector surface. The mixtures shown in the table are generally adequate for producing diffusely reflective coatings as discussed above relative to FIGS. 1A and 1B.

The first pair of columns in the table show actual weights (grams) and percentages by weight (%) for the pigment, the distilled water and the binder, in a typical recommended mixture for spray application or the like. The next pair of columns in Table 2 show weights and percentages by weight for the pigment, the distilled water and the binder where the amount of pigment is the maximum value that will produce acceptable results, assuming use of the 'typical' values for the water and the binder. For example, this embodiment contains 829.51 grams of the pigment, although the actual weights for the water and the binder are the same as in the first or 'typical' example.

The third pair of columns in Table 2 show weights and percentages by weight for the pigment, the distilled water and the binder where the amount of pigment is the minimum value that will produce acceptable results, assuming again the 'typical' values for the water and the binder. This example contains 829.51 grams of the pigment, although the actual weights for the water and the binder are the same as in the first or 'typical' example.

TABLE 3

| Component | Quart Kit: | Gallon Kit: |
| --- | --- | --- |
| zo | 754.1 g Kadox 930C Zinc Oxide | 3016.4 g Zinc Oxide Kadox 930C |
| $H_2O$ | 414.65 g Deionized $H_2O$ | 1658.6 g Deionized $H_2O$ |
| ps | 588 g Potassium Silicate Kasil 2130 | 2352 g Potassium Silicate Kasil 2130 |

As noted, the invention is applicable to diffusely reflective surfaces and devices in a wide variety of radiant energy transducer systems, although the inventive concepts are particularly advantageous in the context of high-intensity visible light illuminations systems, such as luminaires and light bulbs. To appreciate application of the invention to such lighting systems or devices, it may be helpful to consider several examples.

Figure 2:
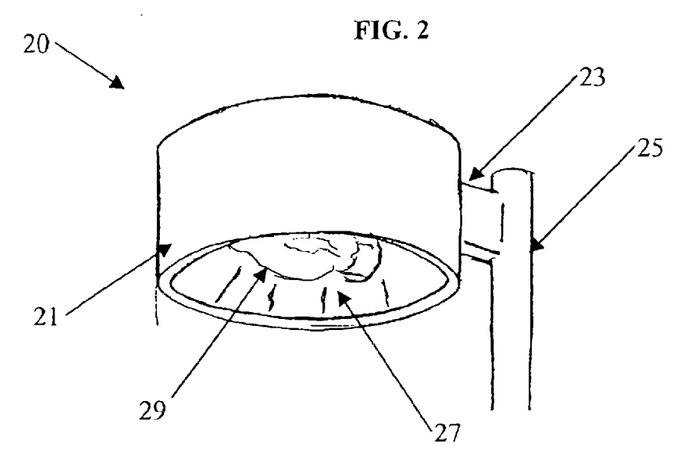
FIG. 2 is a perspective view of a post top luminaire or light, with a painted reflector, in accord with an embodiment.

FIG. 2 shows an application of the principles of the present invention in a post-top luminaire or light 20, for example for lighting of a parking lot or outdoor walkway. The luminaire 20 includes a housing 21 supported by an arm 23 at or near the top of a post 25. The post is shown in a vertical orientation in this example. The luminaire 20 is mounted on the arm 23 and the post 25 in such a manner as to emit light downward to illuminate and area at and around the base of the post (not shown). The luminaire 20 includes a reflector 27, painted with the zinc oxide-potassium silicate material in accord with one of the presently preferred embodiment of the invention.

A high-intensity lamp 29 emits light. Much of the light from the lamp 29 flows directly downward. However, the lamp 29 also emits a substantial amount of light upward and to the sides, which the reflector 27 directs downward toward the desired area of illumination. Assuming that the coating on the reflector 27 comprises the inventive material in a thickness of 2.75 mils or more, the reflector exhibits a diffuse reflectivity of 95% or higher.

Figure 3:
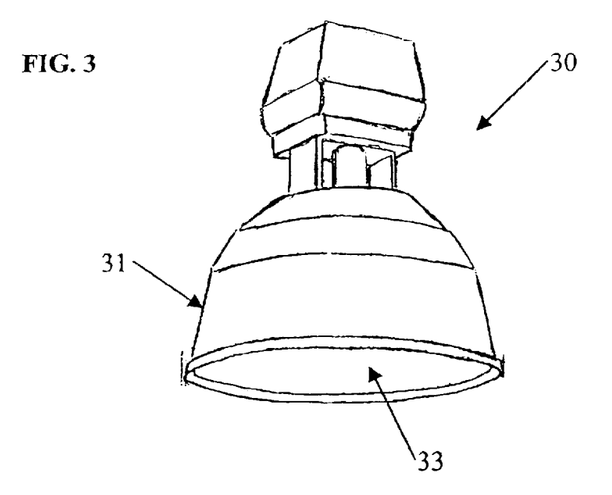
FIG. 3 is a perspective view of a high-bay light, with a painted reflector, in accord with another embodiment.

FIG. 3 illustrates an application of the principles of the present invention in high-bay light 30, for example for recessed mounting in a bay constructed in a ceiling or the like. The luminaire 30 includes a reflector substrate 31, which surrounds the lamp (not visible in the illustrated orientation of the unit 30). The luminaire 30 typically is mounted in a recess or bay, in such a manner as to emit light downward to illuminate, although the unit 30 may be mounted in a variety of other orientations to direct light at a wall or ceiling for indirect lighting applications. The luminaire 30 includes a reflective coating 33, which is painted onto the reflector substrate 31. The coating 33 comprises the inventive zinc oxide-potassium silicate material, and thereby provides a highly efficient diffuse reflectivity over the desired area of illumination of the luminaire 30.

Figure 4:
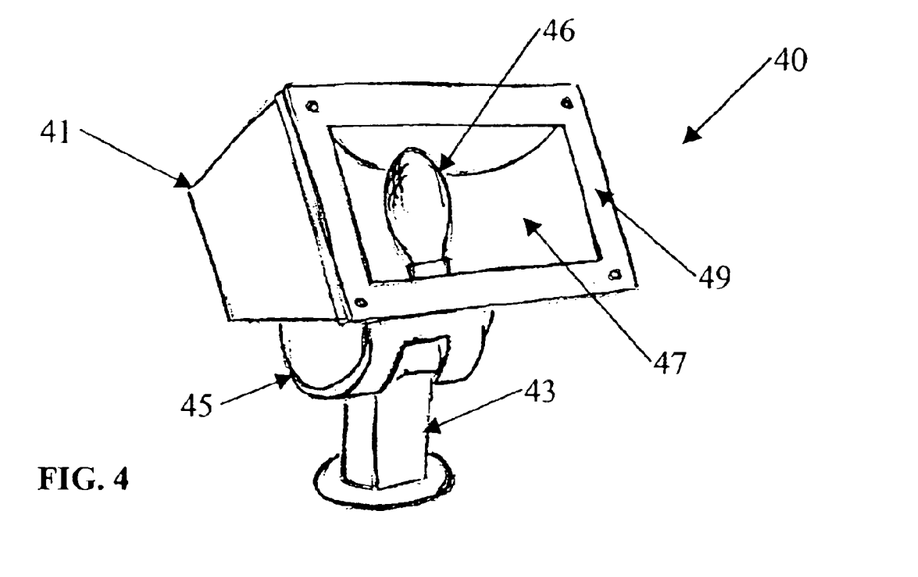
FIG. 4 is a perspective view of a flood-light, with a painted reflector, in accord with a further embodiment.

FIG. 4 depicts application of the principles of the present invention in a flood-light 40. The flood-light 40 includes a housing 41 supported on a bracket 43 connected to a hinged or pivotable mounting assembly 45, to allow adjustment of the flood-light and thus of the direction of light emitted thereby. The luminaire portion of the flood-light 40 includes high-intensity lamp 46 and a reflector 47. The reflector substrate is painted with the zinc oxide-potassium silicate material in accord with one of the presently preferred embodiments discussed above. The lamp 46 together and the painted surface of the reflector 47 direct light toward an area desired for flooding illumination. The floodlight 40 also includes a rectangular ring 49, secured to the periphery of the housing 41, to hold a transparent cover. The cover and the housing 41 enclose the reflector 47, the lamp 46 and the other components of the floodlight 40, and thereby protect those components from exposure to the elements.

Figure 5:
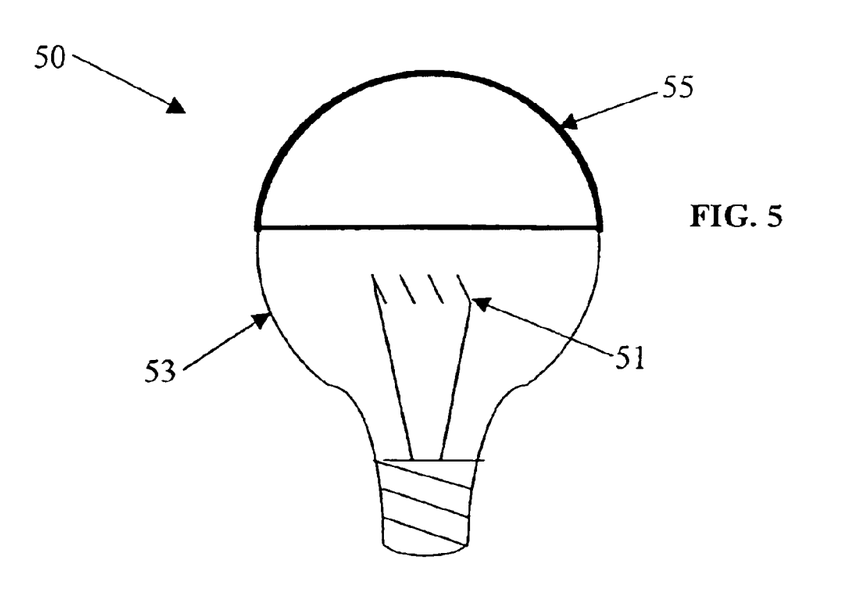
FIG. 5 is a side view of a lamp bulb incorporating the reflective coating, in accord with a further embodiment.

The concepts of the invention also encompass direct application of the zinc oxide-potassium silicate coatings to surfaces of lamps or light bulbs, for example as shown in FIG. 5. In that embodiment, the lighting system 50 essentially comprises a single light bulb, which includes a filament (transducer) 51 and a glass or other globe type of enclosure 53. The inventive coating 55 may be painted onto the inside of the transparent globe (substrate) before assembly of the light bulb 50. In the illustrated embodiment, however, the light bulb is a fully assembled, off-the-shelf item. In that case, the bulb is sprayed with or dipped into the coating mixture, to form the reflective coating 55 on the desired portion or portions of outside of the globe (substrate) 53. The coating may be applied to any portion of the globe 53, for example on the surface opposite the base, in a ring at or near the base, or on just one of the sides, in order to achieve a desired reflective characteristic. The inventive coating may be applied to surfaces of other types of lamps, such as fluorescent or neon lamps.

From the discussion of the examples above, it should be apparent that the inventive principles are applicable to essentially all radiant energy processing systems, which require a diffusely reflective surface. The inventive principles of course are particularly advantageous in such systems wherein the diffusely reflective surface must also withstand relatively high temperatures. Among such systems are a variety of energy detectors and distributors that also rely on principles of constructive occlusion. To appreciate aspects of the invention as specifically applied in constructive occlusion type systems, it may be helpful to consider several examples of luminaires or light distributors of that type, which would incorporate the diffusely reflective coating in accord with the present invention.

Figure 6:
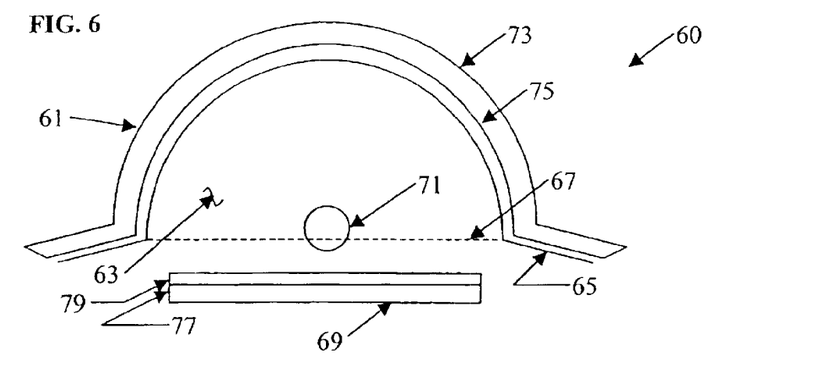
FIG. 6 is a cross-section view of a mask, cavity and shoulder type illumination system utilizing constructive occlusion, incorporating a reflective coating formed in accord with an inventive embodiment.

FIG. 6 shows application of the principles of the present invention in a mask, cavity and shoulder type illumination system 60 utilizing principles of constructive occlusion. In accord with the invention, the system 60 incorporates a number of reflectors comprising a substrate coated with one of the inventive the zinc oxide-potassium silicate materials. Although the combination of the material with principles of constructive occlusion is applicable to energy detection systems and a wide range of the spectrum, for discussion purposes, we will concentrate on examples for illumination with visible light energy.

This drawing depicts a first, simple embodiment of a light distributor apparatus or luminaire 60, for projecting light with a tailored intensity distribution using the principles of constructive occlusion. In the illustration, the luminaire 60 is oriented to provide downward illumination. Such a system 60 might be mounted in or suspended from a ceiling or canopy or the like. Those skilled in the art will recognize that the designer may choose to orient the system 60 in different directions, to adapt the system to other lighting applications.

The luminaire 60 includes a base 61 having or forming a cavity 63, and an adjacent ring-shaped shoulder 65. The cavity 63 forms a partial enclosure with an opening or aperture 67 thereof, forming an active optical area of the base 61. A disk-shaped mask 69 is disposed between the cavity aperture 67 and the field to be illuminated by the luminaire 60. In a fully symmetrical embodiment, the aperture 67 is circular, and the shoulder 65 completely surrounds the aperture 67.

In many embodiments, the cavity 63 comprises a substantial segment of a sphere. For example, the cavity may be substantially hemispherical as shown. However, the cavity's shape is not of critical importance. A variety of other shapes may be used. For example, half-cylindrical cavities having a square or rectangular aperture or even having a nearly linear aperture with a narrow rectangular opening are contemplated for certain specific applications requiring a more rectangular illumination footprint in the region illuminated by the constructive occlusion technique. Practically any cavity shape is effective, so long as it has a diffuse reflective inner surface. A hemisphere is preferred for the ease in modeling its azimuthal symmetry and for its ease in construction. In the illustrated embodiment, the base and the shoulder are circular, although other shapes may be used.

The mask 69 is positioned between the aperture 67 of the base 61 and the target area, region or surface to be illuminated. As such, the mask 69 is outside of the cavity 63. For example, in the orientation shown, the mask 69 is below the aperture 67 of the cavity 63.

A source 71 emits electromagnetic radiation, for example as visible light, into the volume between the cavity surface and the facing surface of the mask. The system may include a variety of different types of sources, including light bulbs, one or more LEDs, and one or more optical fibers coupled to remote light generation components. In the example shown, the light source 71 is an idealized spherical source emitting radiation in virtually all directions. Such a source 71 may be at any convenient location between or adjacent to either one of the surface of the cavity and the surface of the mask.

In this simple embodiment, the base 61, with the cavity 63 and shoulder 65 are formed as a single integrated first reflector unit. This unit comprises a substrate 73 of appropriate shape, formed of steel or aluminum or an aluminum alloy. The reflector unit also includes a reflective coating 75 painted onto the surfaces of the substrate that form cavity 63 and the shoulder 65, to give those surfaces the desired diffuse reflectivity. In accord with the inventive principles, the coating 75 consists of the paint mixture, consisting essentially of the uncalcined zinc oxide pigment with a small amount of propionic acid and the potassium silicate binder. In the context of the constructive occlusion type system 60, this material provides a highly efficient Lambertian surface having a diffuse reflectance of more than 95%, for visible and near-infrared wavelengths. A Lambertian surface emits light with substantially uniform intensity in all directions.

The mask 69 is essentially forms a second reflector unit, manufactured in accord with aspects of the invention. At least the surface of the mask 69 facing toward the aperture 67 is formed in a manner similar to that used to create the reflective surfaces on the base. Hence, the exemplary mask 69 comprises a substrate 77 of appropriate shape, formed of steel or aluminum or an aluminum alloy. In the example, the mask is relatively flat, although it may have a variety of other shapes, for example to help enclose a relatively large embodiment of the lamp 71. The mask 69 also includes a reflective coating 79 painted onto the surface or surfaces of the substrate 77, to give that surface or those surfaces the desired diffuse reflectivity. Although shown on only the facing surface, it is often desirable to similarly coat the ends/sides of the mask and sometimes even the opposite surface of the mask. In accord with the inventive principles, the coating 79 consists of the paint mixture, consisting essentially of the uncalcined zinc oxide pigment with a small amount of propionic acid and the potassium silicate binder.

The light source 71 emits light into the base cavity 63. The light source 71 also directs some light toward the coating 79 on the mask 69, and the light source 71 may direct some light toward the shoulder 65. The light source 71 may emit some light directly through the gap between the aperture 67 and the edges of the mask 69. Light rays impacting on the diffusely reflective surfaces, particularly those impacting on the inner surface of the cavity 63 and the facing surface of the mask 69, reflect and diffuse one or more times within the confines of the system 60 and eventually emerge through the gap between the perimeter of the aperture 67 and the edges of the mask 69. The shoulder 65 diffuses and reflects some of this light toward the field of intended illumination.

For purposes of constructive occlusion, the base 61 may be considered to have an active optical area, preferably exhibiting a substantially Lambertian energy distribution. Where the cavity 63 is formed in the base, for example, the planar aperture 67 formed by the rim or perimeter of the cavity 63 forms the active surface with substantially Lambertian distribution of energy emerging through the aperture. The cavity may be formed in the facing surface of the mask 69. In such a system (not shown), the surface of the base may be a diffusely reflective surface, therefore the active area on the base would essentially be the mirror image of the cavity aperture on the base surface, that is to say the area reflecting energy emerging from the aperture of the cavity in the mask.

In accord with the invention, the mask 69 constructively occludes a portion of the optically active area of the base with respect to the field of intended illumination. In the example of FIG. 6, the optically active area of the base 61 is the aperture 67 of the cavity 63; therefore the mask 69 occludes a substantial portion of the aperture 67, including the portion of the aperture on and about the axis of the mask and cavity system.

The relative dimensions of the mask 69 and aperture 67, for example the relative diameters or radii in the circular embodiment as well as the distance of the mask 69 away from the aperture 67, control the constructive occlusion performance characteristics of the light luminaire system 60. Certain combinations of these parameters produce a relatively uniform intensity with respect to angles of emission, over a wide portion of the field of view about the system axis (vertically downward in FIG. 6), covered principally by the constructive occlusion. Other combinations of size and height result in a system performance that is uniform with respect to a wide planar surface perpendicular to the system axis at a fixed distance from the aperture.

Because of the use of the coating 75, the shoulder 65 also diffusely reflects at least some light downward. The angle of the shoulder and the reflectivity of the surface thereof facing toward the region to be illuminated by constructive occlusion also contribute to the intensity distribution over that region. In the illustrated example, the diffusely reflective shoulder 65 is angled somewhat downward from the plane of the aperture 67.

Because the system 60 is substantially closed, that is to say by the substantial occlusion of the aperture 67 by the mask 69, the system tends to retain substantial amounts of the heat emitted by the light source 71. For example, if the lamp is a halogen light bulb or a metal halide lamp contained within the space enclosed by the cavity 63 and the mask 69, system temperatures may reach as high as 700° C. Many diffusely reflective materials can not long withstand such temperatures and/or the attendant light pressures. The inventive coating material, however, can.

More detailed discussions and a wide range of examples of constructive occlusion type transducer systems may be found in commonly assigned U.S. Pat. Nos. 6,064,061 and 5,914,487 both to Ramer et al., the disclosures of which are incorporated herein entirely by reference.

Figure 7:
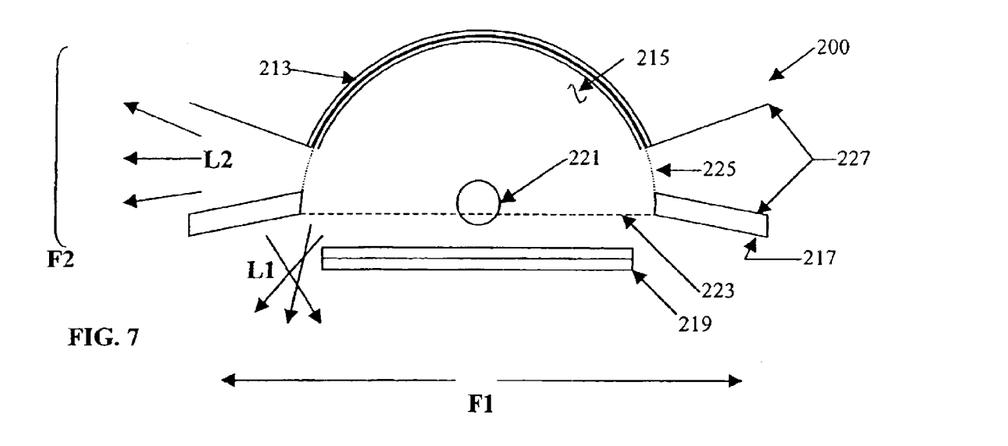
FIG. 7 is a cross-sectional view of a simple embodiment of an illumination system utilizing constructive occlusion in combination with a port and deflector structure, and the inventive diffuse coating, in accord with the principles of the present inventions.

FIG. 7 is a cross-sectional view of an embodiment of the invention, combining the constructive occlusion principles of the system of FIG. 6 with a port and a fan-like light distributor or deflector structure. The system 200 distributes light rays such as L1 over a first region or field F1 of intended illumination by constructive occlusion. The cavity and mask may be considered as a rough approximation of a spherical integrating cavity. This integrating cavity couples light to the port and deflector, which directs light rays such as L2 toward a second field or region F2 intended for illumination.

In the illustration, the system 200 includes a base 213 having or forming a cavity 215. If fully extended to the aperture 223, the cavity 215 would have essentially the same shape as the cavity in system 60 (FIG. 6). A ring-shaped shoulder 217 surrounds the aperture 223. The system includes a light bulb or other light source shown at 221. For purposes of this discussion, the aperture 223 forms the active optical area with respect to the base 213. A disk-shaped mask 219 is disposed between the cavity aperture 223 and the first field F1 to be illuminated (downward in the illustrative orientation). As in the system 60, at least the inner surface of the cavity 215 and the facing surface of the mask 219 are coated with the diffusely reflective zinc oxide-potassium silicate material. The surface of the shoulder 217 facing toward a portion of the first region F1 is reflective, although it may be specular or diffusely reflective. These elements illuminate the first region F1 by constructive occlusion essentially as described above. The drawing shows limited examples L1 of the light rays produced by constructive occlusion to illuminate the first area F1.

In the system 200 of FIG. 7, however, the base 213 has one or more elongated ports 225. In this case, the port(s) 225 represent one or more openings from the cavity 215 outward and somewhat away from the first intended field of illumination. A deflector 227, preferably formed as a fan-shaped structure located along the port(s), directs light emerging from the cavity through the port(s) 225 toward the second region F2 intended for illumination by the system 200.

The cavity 215 may be substantially spherical or cylindrical, or it may consist of a segment of a sphere or a cylinder. In the example illustrated in FIG. 7, assume that the cavity 215 is substantially hemispherical. The port 225 preferably takes the form of an annular opening in the shape of a ring around the cavity at least a portion and possible the entire circumference of the cavity. In this example, the annular opening 225 is spaced a distance from the aperture 223, although there may be other embodiments wherein the port is substantially adjacent to the aperture. This type of system includes embodiments in which the deflector fans out around the system, so as to completely encircle the port formed around the perimeter of the base 213 (360°). This type of system also includes embodiments in which the deflector partially fans out around or only partially extends around the perimeter of the base 213 (e.g. in a range from 180° to 270° around the perimeter).

The port 225 allows some light processed within the cavity 215 to emerge outward in a different direction, separate and apart from the light processed and emitted downward by the constructive occlusion technique. Light passing through this port 225 enters a spreading or expanding-height deflector 227. Viewed in cross-section, on each side of the base 213, the exemplary deflector structure 227 has a cross-section similar to that of a cone with a straight angled wall. The narrow end of the inner surface of the deflector 27 is optically coupled to the port 225. The deflector 227 expands (in height in the illustrated orientation) as it extends from the port 225 toward the second area F2 of intended illumination.

In the illustrated example, the deflector essentially comprises two angled planar surfaces. The entire area of each of these surfaces is reflective. At least a portion of each reflective surface of the deflector 227 is specular. A specular, reflective material reflects light in such a manner that the angle of reflection of the redirected light with respect to the reflective surface has the same magnitude as the angle of incidence of the incoming light relative to that surface. However, the term "specular" covers a range of materials and reflectivities. A highly specular material has a mirror-like finish, for example formed by silver and glass coatings or formed of highly polished aluminum. A quasi-specular material will not reflect as efficiently as a highly specular material and may cause some diffusion of the light. However, most of the reflected light will satisfy the principle that angle of reflection equals angle of incidence. As an example, a quasi-specular surface may be formed of lightly polished aluminum.

Preferably, a substantial portion of each inner surface of the deflector 227 has a specular reflectivity. The entire surface may be uniformly specular (e.g., highly specular). Alternatively, one or more sections of the inner walls of the deflector may have a different degree of specular reflectivity (e.g., quasi specular). As a further alternative, one or more sections of those walls may have a diffuse reflectivity due to coating thereof with the diffusely reflective zinc oxide-potassium silicate material.

The port 225 and the deflector 227 are dimensioned relative to a desired field of illumination such that the inner surface of the deflector 227 deflects light that would otherwise pass out of the desired second field of intended illumination within that desired field F2. Around its circumference, the fan-shaped deflector structure will direct or distribute light from the port 225, represented on the left side by the light rays L2, toward the second area F2 that the system 200 is designed to illuminate. The fan-shaped deflector 227 may provide a substantially uniform light intensity distribution over the second field of intended illumination F2.

In the illustrated example, the second area F2 illuminated through the port and distributor extends out toward and somewhat above the horizon of the system 200. Near the shoulder 217, the two fields of illumination F1 and F2 may not overlap. However, at substantial distances from the system 200, the two fields will overlap somewhat. It should be apparent, however, that despite the overlap the two fields of view of the system 200 actually illuminate two substantially different areas. The central portion of the first field of view is not illuminated by any light from the port 225 or the deflector 227. Instead that portion of the first field F1 is illuminated only by the constructive occlusion processing. Conversely, the portion of the second field F2 that extends substantially above the system horizon receives little or no light from the constructive occlusion illumination of the area F1.

Figure 8:
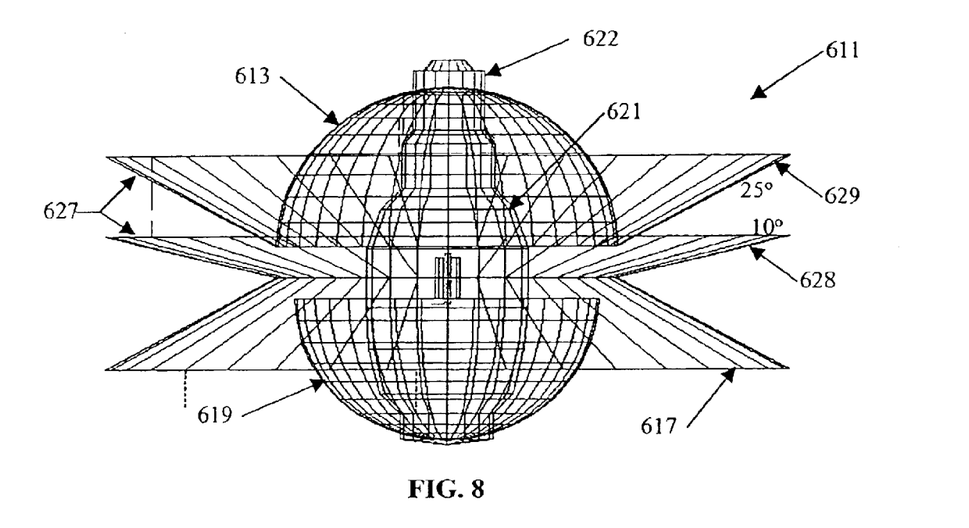
Figure 9:
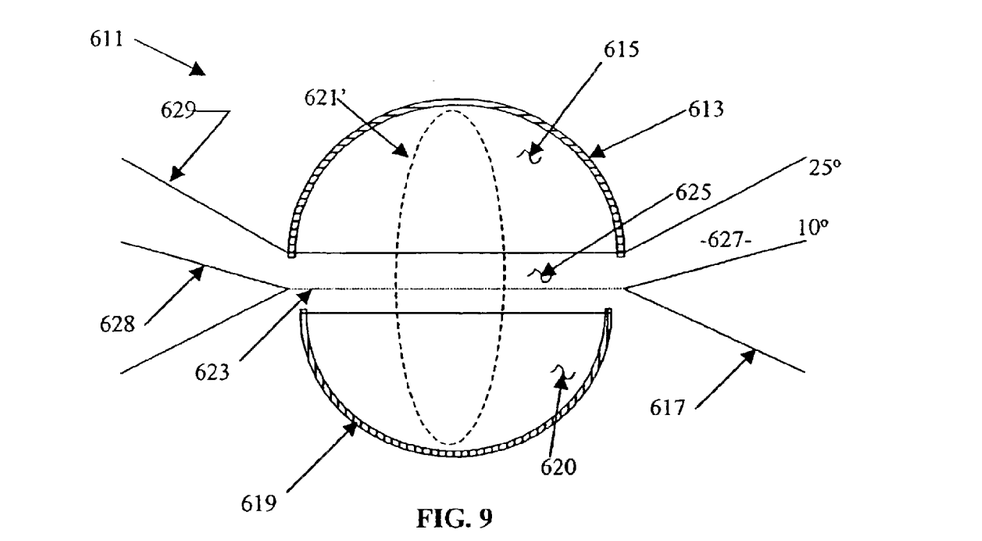
FIG. 9 is a cross-sectional view of the embodiment of FIG. 8.
Figure 10:
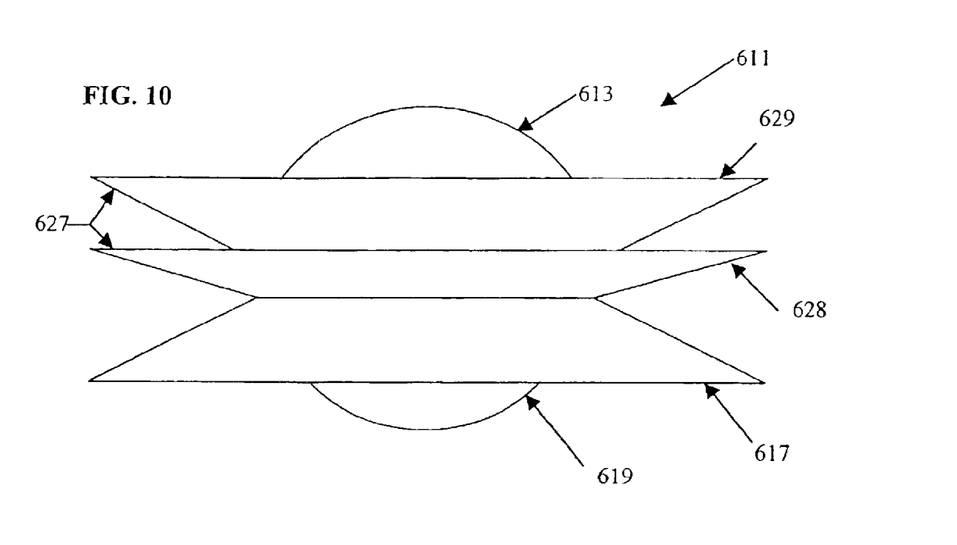
FIG. 10 is a side view of the embodiment of FIG. 8.
Figure 11:
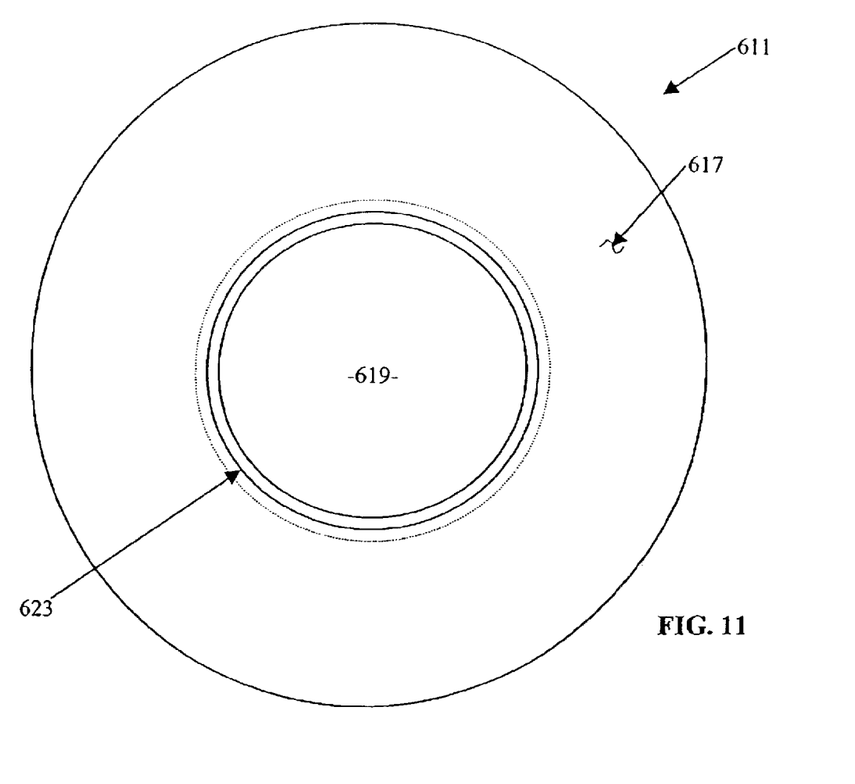
FIG. 11 is a bottom plan view of the embodiment of FIG. 8.

A preferred embodiment of a ported cavity and fan system, incorporating the inventive diffusely reflective coating on appropriate surfaces, is shown in various views in FIGS. 8 to 11. FIG. 8 is a computer line drawing, FIG. 9 is a partial cross-section view, FIG. 10 is a side view, and FIG. 11 is a bottom plan view, of such an embodiment. This embodiment is particularly useful in certain under-canopy type lighting applications, for example to provide illumination under the canopy of a service station.

This embodiment comprises two opposing domes 613 and 619 of slightly different diameters supported at a distance from each other. Each dome may be substantially hemispherical. The inner surfaces of the domes 613, 619 are diffusely reflective. Typically, each dome comprises an aluminum substrate with the interior surface thereof coated with a zinc oxide-potassium silicate material, as in any of the earlier embodiments.

The upper dome 613 forms the base and is slightly larger in horizontal diameter than the lower dome 619, which forms the mask for constructive occlusion purposes. The inner surface of the upper dome 613 forms a diffusely reflective cavity 615 in the shape of a segment of a sphere. The reflective interior 620 of the lower dome 619 could be considered as a cavity, but for purposes of discussion here we will refer to the reflective interior region 620 as a reflector surrounding a portion of the light source.

A metal halide lamp 621 mounted between the inner surfaces of the domes serves as the light source. An electrical connector 622 extends through an opening in the upper dome 613 and provides a coupling for the metal halide lamp 621 to an appropriate power source (not shown).

The mask 619 takes the form of a second dome forming a reflector or second cavity 620 mainly to accommodate the size and shape of the preferred lamp, i.e. the metal halide lamp 621 (FIG. 8) at the location shown diagrammatically by the dotted-line oval 621' in the cross-section view of FIG.

9. The system 611 may use the dome-shaped mask, a smaller dome or even a flat disk-shaped mask, if the designer elects to use a different type or size of light source. The combination of the cavity 615 and the deflector 620, within the domes, closely approximates a spherical optical integrating cavity.

The system 611 also comprises three angled, circular plates 617, 628 and 629 mounted to encircle the two domes 613, 619 as shown. Each angled plate takes the form of a truncated, straight-sided cone. The cone formed by the lower plate 617 has its broad end down. The cone of the plate 628 has its broad end upward as does the cone of the plate 629. The sidewall of the cone of the plate 628 preferably has a 10° angle relative to horizontal, and the sidewall of the cone of the plate 629 preferably has a 25° angle relative to horizontal.

The lower or inner surface of the plate 617 is reflective and serves as the shoulder formed about the constructive occlusion aperture 623 of the system 611. The upper or inner surface of the plate 628 is reflective and serves as one wall of the expanding fan-shaped deflector 627. The lower or inner surface of the plate 629 is reflective and serves as the other wall of the expanding fan-shaped deflector 627. The reflective shoulder surface of the plate 617 preferably is specular, although materials providing a diffuse reflectivity or other type of reflectivity could be used on that surface. If the particular application benefits from diffuse reflectivity, the shoulder would be coated with one of the zinc oxide-potassium silicate materials discussed above.

At least a substantial portion of each of the reflective surfaces of the deflector 627 has a specular reflectivity. Some sections of those surfaces may have a different reflectivity, such as a diffuse reflectivity adjacent the outer ends of the surfaces, for certain applications. If the plates 628, 629 forming that deflector are aluminum, for example, appropriate portions thereof may be polished. If it is desirable for certain sections to be diffusely reflective, the manufacturer would paint those sections with one of the zinc oxide-potassium silicate materials in the manner discussed earlier.

The junction between the plates 617 and 628 forms the aperture 623. The space between that boundary and the lower edge of the plate 629 forms an annular port 625 formed in the wall of the base 613 to provide the optical coupling of the cavity 615 to the deflector 627. In this embodiment, annular port 625 is adjacent to the aperture 623. This position for the port is preferred, for ease of construction, but the annular pot could be at any elevation on the dome forming the base 613 and cavity 615, to facilitate illumination of a second field or region at a particular angular range relative to the system 611.

In this embodiment, the port 625 is formed along the boundary between the edge of the cavity 615 and the shoulder 617. Consequently, the inner edge of the shoulder 617 actually defines the aperture 623 for constructive occlusion purposes with respect to the first region intended for illumination by the system. The aperture 623 is said to be the aperture of the base-cavity 615 and define the active optical area of the base 613 essentially as if the sides of the cavity 615 extended to the edges of the shoulder 617 (without the port).

Hence the cavity 615, the aperture 623, the mask 619 and the shoulder 617 provide constructive occlusion processing of a first portion of the light from the source 621. The light emitted as a result of such processing provides a tailored intensity distribution for illumination of a first region, which is below the system 611 in the orientation shown. The relative dimensions of the aperture and mask, the distance of the mask from the aperture and size and angle of shoulder 617 determine the intensity distribution in this region, as in the earlier embodiments.

With respect to the port 625, the diffusely reflective surfaces 615 and 620 inside the two domes 613 and 619 together approximate an optically integrating sphere. The integrating sphere processes light from the internal source 621 and provides an efficient coupling of such light through the port 625.

The fan-shaped deflector 627 directs light emerging through the port 625 upward, away from the first (downward) field of intended illumination. In the illustrated example, the plates 628 and 629 form a limited second field of view for angles roughly between 10° and 25° above the horizontal. When measured with respect to the downward illumination axis of the system 611 as is used in lighting industry standards, this second field of illumination encompasses angles between 100° and 115°. Although some light passing through the port 625 is still directed outside the field of view defined by the deflector walls 628, 629, the reflective surfaces of the deflector 627 do channel most of the light from the port 625 into the area between the angles formed by those walls. As a result, the maximum intensity in the second illuminated region is between the angles defining the field of view of the deflector 627.

In this embodiment, the fan-shaped deflector structure is angled so as to direct light away from the field illuminated by constructive occlusion. The two illuminated regions do not overlap at all. The plates 617 and 628 create a dead zone of no illumination between the two regions.

In use, the system 611 is mounted or hung under a canopy. The mounting may place the upper edge of the upper angled plate 629 of the deflector 627 at the surface of the underside of the canopy or a few inches below that surface.

The system 611 emits approximately 60% of the light energy upward, via the port 625 and the fan-shaped deflector structure 627. The system 611 emits approximately 40% of the light downward, as processed by constructive occlusion. The emissions upward are separated from the downward emissions by a large dead zone around the horizon (90°). The dead zone prevents direct illumination of adjacent areas, for example on a nearby highway or in a house next-door to the gas station.

Because of the structure of the system 611, the light that otherwise would emerge undesirably in the dead zone is kept within the system and reprocessed by the reflective surfaces of the system, until it emerges into one or the other of the two desired fields of illumination. The system 611 therefore provides the desired lighting performance with a particularly high degree of efficiency. Because of the use of aluminum painted or otherwise coated with the zinc oxide-potassium silicate material, a relatively tight structure around the metal halide lamp 621 is still able to withstand the relatively high temperatures and light pressures within the domes 613, 619. Hence, the system can be relatively small in size yet provide a highly efficient and desirable lighting performance, without concerns about deterioration or flame hazard due to overheating of the diffusely reflective material. The system 611 also is relatively simple to build, using economical mass-production techniques.

The lighting system structure illustrated in FIGS. 8-11 is round and symmetrical about a vertical system axis. For other applications, the design could be made rectangular or even linearized.

In the embodiments discussed above, the systems have provided lighting in a symmetrical fashion on both sides of the system. Such constructions are appropriate for many down-lighting and up-lighting applications, where the system is mounted below a ceiling or canopy or mounted on a pole or other support in an open area. The concepts of the invention also encompass variations on the disclosed structures modified or "cut in half" by a reflective surface to facilitate wall mounting thereof.

A more detailed discussion of various embodiments of ported cavity and fan systems, that may utilize the inventive diffusely reflective coating may be found in commonly assigned U.S. patent application Ser. No. 09/512,086 filed on Feb. 24, 2000, entitled "Constructive Occlusion Lighting System with Ported Cavity and Fan Structure," the disclosure of which is incorporated herein entirely by reference.

Those skilled in the art will recognize that the present invention has a broad range of applications, and the embodiments admit of a wide range of modifications, without departure from the inventive concepts.

For example, most applications of the paint involve spraying onto substrate surfaces of reflectors formed outside of the lamp. The invention also encompasses direct application of the paint to inner and outer surfaces of a lamp, such as the glass of a halogen or metal halide light bulb (FIG. 5).

As another example, the discussion above has concentrated on application of the paint to lamps, luminaires, sensors and other types of energy transducing systems, particularly for reflective processing of visible light. The paint, however, may have a variety of other useful applications, for example in measurement equipment such as integrating spheres. Other applications include inside surfaces of laser pump cavities, lighted sign boxes, and other lighted display devices such as flat screen display monitors.

While the foregoing has described what are considered to be the best mode and/or other preferred embodiments of the invention, it is understood that various modifications may be made therein and that the invention may be implemented in various forms and embodiments, and that it may be applied in numerous applications, only some of which have been described herein. It is intended by the following claims to claim any and all modifications and variations that fall within the true scope of the inventive concepts.

What is claimed is:

1. A coating material for application to a substrate of a reflector for a radiant energy transducer system, the coating material exhibiting a diffuse reflective characteristic, a high reflectivity to radiant energy and a high stability when exposed to relatively high temperatures, the coating material comprising:
   (a) a pigment comprising a predominant proportion of uncalcined zinc-oxide;
   (b) an alkali metal silicate vehicle-binder; and
   (c) sufficient water to provide a mixture suitable for application to the substrate of the reflector,
   wherein the ratio of weight of the pigment to weight of the vehicle-binder in the coating is between 1.15:1 and 1.41:1, and
   the pigment contains ½% by weight of propionic acid.

2. The coating material of claim 1, wherein said ratio is approximately 1.28:1.

3. A diffusely reflective water soluble paint, comprising:
   (a) a pigment consisting essentially of uncalcined zinc-oxide pigment and ½% by weight of propionic acid;
   (b) a potassium silicate vehicle-binder; and
   (c) sufficient water to provide a mixture suitable for application to a substrate,
   wherein the ratio of weight of the pigment to weight of the vehicle binder in the water soluble paint is between 1.15:1 an 1.41:1.

4. The paint of claim 3, wherein said ratio is approximately 1.28:1.

* * * * *